United States Patent [19]
Itoh et al.

[11] Patent Number: 5,375,015
[45] Date of Patent: Dec. 20, 1994

[54] HEAT RESISTING REFLECTION MIRROR

[75] Inventors: Naoko Itoh, Murayama; Mizuho Shimada, Yokohama, both of Japan

[73] Assignee: Equestrian Co., Ltd., Tokyo, Japan

[21] Appl. No.: 924,987

[22] Filed: Aug. 5, 1992

[51] Int. Cl.[5] .......................... G02B 5/08; G02B 7/195
[52] U.S. Cl. ..................................... 359/845; 359/883; 362/345; 362/346; 362/373
[58] Field of Search ....................... 359/845, 883, 884; 126/599, 684, 696; 362/345, 346, 373

[56] References Cited

U.S. PATENT DOCUMENTS

| | | | |
|---|---|---|---|
| 1,977,639 | 10/1934 | Langdon | 359/883 |
| 1,998,088 | 4/1935 | Langdon | 359/884 |
| 3,363,998 | 1/1968 | Keister et al. | 359/884 |
| 3,841,737 | 10/1974 | Rambauske et al. | 359/883 |
| 4,457,598 | 7/1984 | Shimabukuro et al. | 359/883 |
| 4,490,184 | 12/1984 | Forcht et al. | 359/884 |
| 5,323,271 | 6/1994 | Shimada | 359/845 |
| 5,327,293 | 7/1994 | Shimada | 359/845 |

*Primary Examiner*—Ricky D. Shafer
*Attorney, Agent, or Firm*—Lowe, Price, LeBlanc & Becker

[57] ABSTRACT

The reflection mirror of this invention is considered an improvement over the conventional art in that it has a plating means that smoothes the inner surface of the reflection mirror body and a means for intercepting the heat of the light and that the mirror can be assembled into a desired size. The feature of this improvement is that the simplified polishing work that smoothes the inner surface of the reflection mirror body does not degrade but rather improves the quality of the mirror, uniformity of illumination directivity, and productivity. Since the heat absorbing layer absorbs heat rays, any deterioration of an object being illuminated can be prevented. Another advantage is that it is possible to prevent loss of freshness of food, and discoloration and deformation of products that might otherwise be caused by heat rays.

3 Claims, 2 Drawing Sheets

HEAT RESISTING REFLECTION MIRROR

BACKGROUND OF THE INVENTION

1. Field of the Invention

The present invention relates to a reflection mirror used for a particular object and more specifically to a reflection mirror which can stabilize the directivity of illumination, absorb ultraviolet rays and heat rays such as visible light, and can be assembled into a desired size.

2. Description of the Prior Art

Where the body material of this kind of reflection mirror is made of metal, such as aluminum with high purity, the conventional electrolytic polishing method consists in forming the reflection mirror body into a desired shape; smoothing the surface by buffing; degreasing it with an alkaline solution; glossing the surface with the electrolytic polishing; and forming an electrode oxide film to seal pores. In a case where the body material of the reflection mirror is made of other than aluminum, the polishing method consists in baking the metal surface with a polyimide heat resistant paint, forming a smooth, glossy aluminum coating of high purity over the heat resistant paint, and then vacuum-vaporizing a glassy protective film of silicon oxide to the thickness of 0.1-0.5 micron. In a case where the body of the reflection mirror uses a glass as the heat ray transmitting material, the polishing method performs a dry coating of a visible-ray-reflecting and heat-ray-transmitting material over the inner surface of the glass. Further in a case where the reflection mirror body is formed of a resin material, a heat resistant paint is coated over the surface of the resin body, followed by another coating of an aluminum film of high purity. The aluminum film is then deposited with a glassy protective film by vacuum evaporation.

SUMMARY OF THE INVENTION

The conventional reflection mirror lacks the following: the smoothing of the inner wall of the reflection mirror body that forms the reflection mirror surface by a plating means; the intercepting of heat rays such as visible rays and ultraviolet rays by a black heat absorbing layer interposed between the plating means and the heat ray transmission and absorption layer; and forming the reflection mirror body into a desired size by the reflection mirror assembling means.

The reflection mirror of this invention is considered an improvement over the conventional art in that it has a plating means that smoothes the inner wall surface of the reflection mirror body and a means for intercepting the heat of the light and that the mirror can be assembled into a desired size. The feature of this improvement is that the simplified polishing work that smoothes the inner surface of the reflection mirror body does not degrade but rather improves the quality of the mirror, uniformity of illumination directivity, and productivity. Since the heat absorbing layer absorbs heat rays, any deterioration of an object being illuminated can be prevented. Another advantage is that it is possible to prevent loss of freshness of food, and discoloration and deformation of products that might otherwise be caused by heat rays.

In a preferred embodiment of this invention, the fine uneven surface on the inner wall of the reflection mirror body is plated with a nickel coating, which is then plated with another glossy metal coating, which is further covered with a heat ray absorbing layer. The heat ray absorbing layer is then coated with a heat ray transmitting layer for reflection. To cool the reflection mirror body, a piping is provided to the cooling section of the mirror body and water is run through the piping. A plurality of reflection mirror bodies are mounted to a frame on both sides of an opening formed in the frame and the legs of the reflection mirror bodies are fixed by screws so that the number of reflection mirrors can be adjusted. After the plurality of reflection mirrors are mounted, support members are provided to the sides of the reflection mirrors.

It is therefore an object of this invention to provide a reflection mirror, which is manufactured by forming the reflection mirror body into a desired shape and which can be smoothed even if there is fine unevenness on the inner surface, by applying a reduced processing time of mechanical polishing or buffing.

Another object of the invention is to provide a reflection mirror which can smooth fine roughness remaining on the inner surface by a plating means and also has an anticorrosion capability.

A further object of the invention is to provide a reflection mirror which uses a black heat absorbing layer to prevent cracking, flaking or burning of the plated metal layer and protect products as an object being illuminated from ultraviolet rays and visible light rays and which improves the illumination effects.

A further object is to provide a reflection mirror which cools the reflection mirror body to prevent the mirror from getting excessively hot.

A further object is to provide a reflection mirror which has the mirror body formed as a plate even if the body material is hard, in order to reduce wear of the cutting blade.

A further object is to provide a reflection mirror which allows a mass production even when the mirror body is large.

A further object is to provide a reflection mirror which allows manufacture of the mirror of any size by a simple assembly.

BRIEF DESCRIPTION OF THE DRAWINGS

The drawings show the reflection mirror as one embodiment of the invention.

In FIG. 1, an arrow h represents the direction in which the heat rays from the light source R are absorbed, and an arrow r represents the direction in which the rays without heat are reflected.

DETAILED DESCRIPTION OF PREFERRED EMBODIMENT

Figure 1:
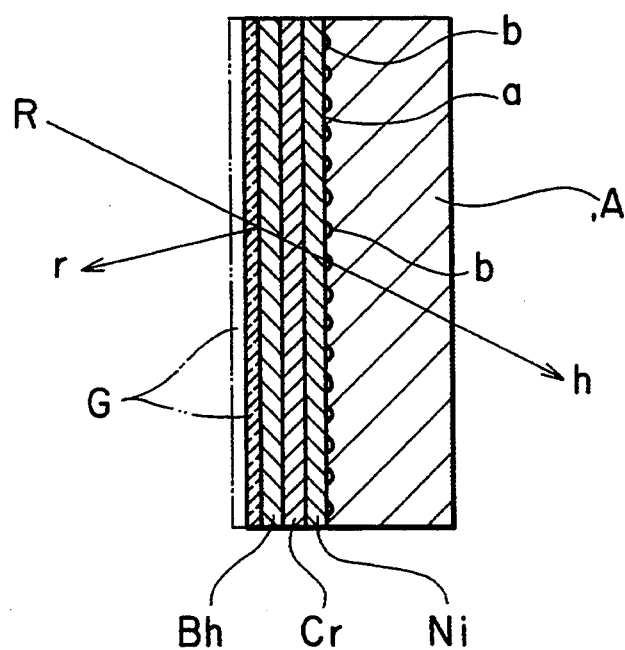
FIG. 1 is an enlarged cross section of an essential portion of the reflection mirror of the invention taken along the line A—A' of FIG. 2.
Figure 2:
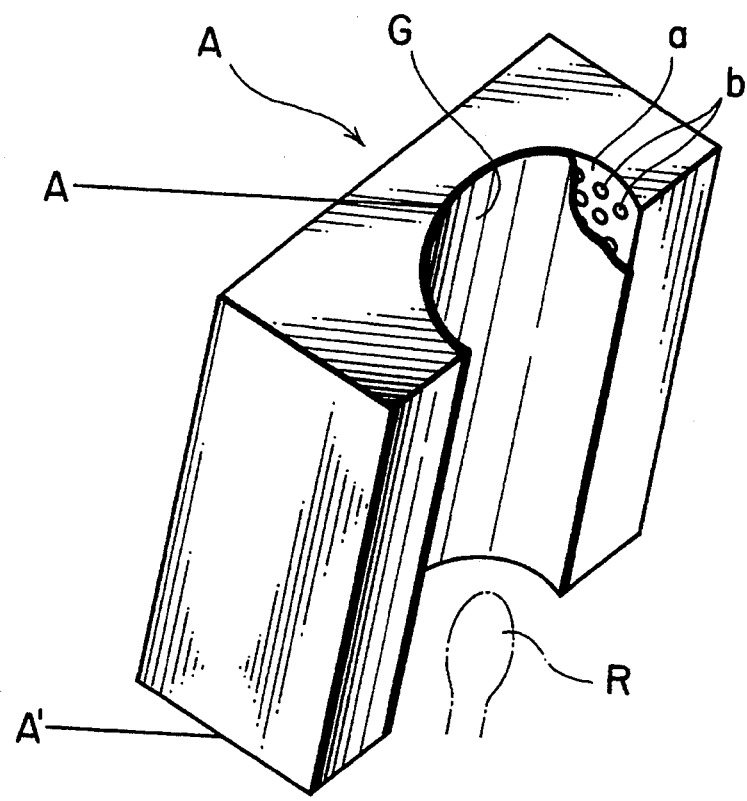
FIG. 2 is a perspective view of the first embodiment of the invention partly cut away.

The above-mentioned objects and features of this invention will become apparent from the following description with reference to the attached drawings. Referring to FIG. 1 and 2, designated R is a light source; and A is a reflection mirror body arranged opposite to the light source R. Formed successively one over the other on the reflection mirror body A are a nickel plated layer Ni that smoothes fine roughness b on the inner surface of the body A, a glossy metal layer Cr that covers and prevents corrosion of the nickel plated layer Ni, a black heat ray absorbing layer Bh that covers the glossy metal layer Cr and absorbs heat of the rays, and a heat ray transmitting layer G for reflection that passes the heat rays. Therefore, the heat ray absorbing layer Bh intercepts the heat rays to prevent deterioration of the nickel plated layer Ni, the glossy metal layer Cr and the object being illuminated (not shown).

The material of the reflection mirror body may be a metal, glass, resin, or a combination of these. The material choice depends on the purpose of the reflection mirror, considering the characteristics of the materials, such as the heat resistivity, ultraviolet resistance, resistance against discoloration, deformation resistance, corrosion resistance, rigidity, plasticity, wear resistance, workability and weight. As metal materials, a brass or aluminum may be used. Aluminum alloy may suitably be used as the body material of the reflection mirror because it is lightweight and easy to cut and also less costly.

If the mirror body A is made of aluminum, it is light and easily cut and drawn. However, removing fine roughness b from the inner surface a that forms a mirror surface requires ample hours of mechanical polishing and buffing. To remove the roughness, the inner surface a is coated thick with the nickel plated layer Ni, on which is formed a glossy plated layer Cr of chrome, gold or silver. If the glossy plating Cr is formed of chrome, it helps prevent formation of pin-holes or cracks. Even when fine roughness b remains on the inner surface a of the reflection mirror body A, the nickel plating layer Ni obviates the troublesome buffing as it has a self-smoothing effect (diffusion layer theory).

The black heat ray absorbing layer Bh that absorbs infrared and ultraviolet rays and heat rays of visible light is vaporized and deposited over the glossy plating layer. The black heat ray absorbing layer Bh intercepts the heat rays to prevent deterioration of the nickel plated layer and the chrome plated layer as well as the object being illuminated. The black heat ray absorbing layer Bh is coated with a heat ray transmitting layer G by evaporation, which passes the heat rays therethrough. Depending on the reflection conditions for illumination, the heat ray transmitting layer G for reflection may be single-layered or multiple-layered and then coated with a protective layer (not shown).

Figure 3:
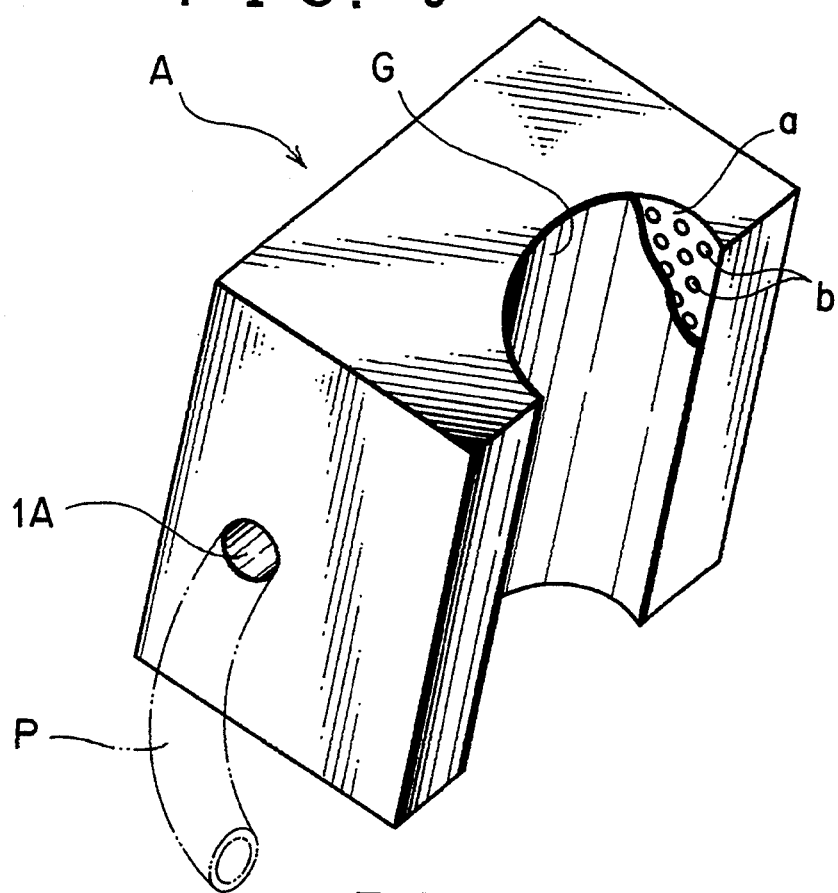
FIG. 3 is a perspective view of the second embodiment of the invention partly cut away.

Referring to FIG. 3, the reflection mirror body A is formed with a cooling section 1A into which to insert the pipe as shown by an imaginary line. The cooling section 1A is a through-hole.

Figure 4:
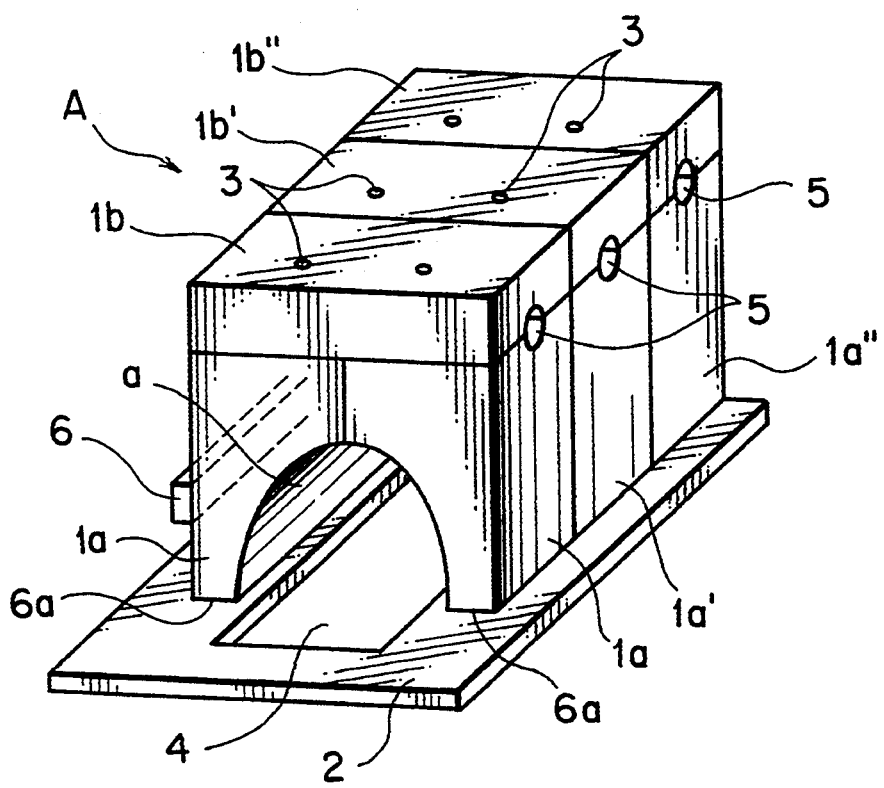
FIG. 4 is a perspective view of the third embodiment of the invention.

In FIG. 4, a frame 2 is formed with an opening 4, on both sides of which the legs 6a of the reflection mirror bodies 1a, 1a', 1a'' are secured to the frame 2 by screws (not shown). These paired legs of the reflection bodies 1a, 1a', 1a'' are secured together by fixing members 1b, 1b', 1b''. The reflection mirror bodies 1a, 1a', 1a'' are aligned side by side and secured together by a support bar 6 and screws so that they are immovable. Since a plurality of reflection mirror bodies 1a, 1a', 1a'' are assembled together, a desired size of the reflection mirror can be obtained by changing the number of the mounted reflection mirror bodies. The inner surfaces a of the plurality of reflection mirror bodies 1a, 1a', 1a'' are provided with a plated coating and a reflection means as with the embodiment of FIG. 1. In FIGS. 3 and 4, the reflection mirror bodies 1a, 1a', 1a'' are formed with through-holes 5, into which cooling pipes P are inserted to cool the mirror bodies A.

What is claimed is:

1. A reflection mirror comprising:
  a light source that emits light;
  a reflection mirror body having a fine roughened inner surface disposed opposite to the light source;
  a nickel plated layer coated over the fine roughened inner surface of the reflection mirror body to smooth the inner surface and improve the directivity of illumination;
  a glossy metal plated layer which covers the nickel plated layer to prevent the corrosion of the latter;
  a black heat ray absorbing layer which covers the glossy metal plated layer and absorbs the heat rays; and
  a heat ray transmitting layer which covers the black heat ray absorbing layer and passes the heat rays therethrough, these four layers being coated successively one upon the other on the inner surface of the reflection mirror body;
  whereby the black heat ray absorbing layer absorbs heat rays to prevent deterioration of an object being illuminated and improves the heat resistance of the mirror.

2. A reflection mirror as claimed in claim 1, wherein the light source and the reflection mirror body disposed facing the light source have a cooling section cooled by water to remove heat.

3. A reflection mirror as claimed in claim 1, wherein the reflection mirror body comprises: a frame formed with an opening; a plurality of parallelly arranged reflection mirror body components with their legs secured to the frame on both sides of the opening; fixing members for securing together a pair of reflection mirror body components; a supporting member for aligning and supporting the plurality of parallelly arranged reflection mirror body components.

* * * * *